(12) United States Patent
Tao et al.

(10) Patent No.: US 7,359,718 B2
(45) Date of Patent: Apr. 15, 2008

(54) LOCATION DETERMINATION AND LOCATION TRACKING IN WIRELESS NETWORKS

(75) Inventors: Meixia Tao, Hong Kong (CN); Kin-Nang Lau, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 354 days.

(21) Appl. No.: 10/836,396

(22) Filed: Apr. 30, 2004

(65) Prior Publication Data
US 2005/0246334 A1    Nov. 3, 2005

(51) Int. Cl.
*H04Q 7/20* (2006.01)
(52) U.S. Cl. ............... 455/456.5; 455/414.1; 455/456.1; 701/207; 701/225
(58) Field of Classification Search ........ 455/63.4, 455/414.1, 456.1, 456.5, 456.6, 561, 404.2, 455/456.2, 456.3, 457; 370/334; 342/368, 342/372, 423; 343/751, 853, 893; 701/207, 701/225
See application file for complete search history.

(56) References Cited

U.S. PATENT DOCUMENTS

| | | | | |
|---|---|---|---|---|
| 4,054,881 A | * | 10/1977 | Raab | 342/448 |
| 4,558,418 A | * | 12/1985 | Keearns | 701/217 |
| 5,068,838 A | * | 11/1991 | Klausner et al. | 368/47 |
| 5,293,642 A | * | 3/1994 | Lo | 455/456.2 |
| 5,327,144 A | * | 7/1994 | Stilp et al. | 342/387 |
| 5,893,033 A | * | 4/1999 | Keskitalo et al. | 455/437 |
| 6,026,304 A | * | 2/2000 | Hilsenrath et al. | 455/456.2 |
| 6,104,344 A | * | 8/2000 | Wax et al. | 342/378 |
| 6,108,557 A | * | 8/2000 | Wax et al. | 455/456.2 |
| 6,148,211 A | * | 11/2000 | Reed et al. | 455/456.2 |
| 6,167,274 A | * | 12/2000 | Smith | 455/456.3 |
| 6,195,046 B1 | * | 2/2001 | Gilhousen | 342/457 |
| 6,195,556 B1 | | 2/2001 | Reudink et al. | |
| 6,236,849 B1 | * | 5/2001 | Reudink et al. | 455/342 |
| 6,263,208 B1 | * | 7/2001 | Chang et al. | 455/456.3 |
| 6,266,514 B1 | * | 7/2001 | O'Donnell | 455/67.13 |
| 6,362,783 B1 | * | 3/2002 | Sugiura et al. | 342/457 |

(Continued)

FOREIGN PATENT DOCUMENTS

CN    1455350    11/2003

(Continued)

OTHER PUBLICATIONS

U.S. Appl. No. 60/491,379, filed Jul. 2003, Damarla et al.*

(Continued)

*Primary Examiner*—William Trost
*Assistant Examiner*—James D Ewart
(74) *Attorney, Agent, or Firm*—Fulbright & Jaworski LLP

(57) ABSTRACT

The present invention is directed to systems and methods which monitor a network environment, collect client information available online, and refine location determinations of individual clients based on observed information as well as online information. More particularly, the present invention is directed to systems and methods which monitor the wireless network, collect online receive signal strength indicator (RSSI) information observations from client users, without requiring knowledge of those clients' locations. The present invention is additionally directed to systems and methods to enhance the accuracy of the location determinations in a network, based on observed client information such as, for example, signal strength references.

52 Claims, 2 Drawing Sheets

U.S. PATENT DOCUMENTS

| | | | | |
|---|---|---|---|---|
| 6,496,701 | B1* | 12/2002 | Chen et al. | 455/456.5 |
| 6,560,531 | B1* | 5/2003 | Joshi | 701/208 |
| 6,564,065 | B1* | 5/2003 | Chang et al. | 455/457 |
| 6,697,630 | B1* | 2/2004 | Corwith | 455/457 |
| 6,757,544 | B2* | 6/2004 | Rangarajan et al. | 455/456.1 |
| 6,782,265 | B2* | 8/2004 | Perez-Breva et al. | 455/456.1 |
| 6,830,213 | B1* | 12/2004 | Gehlot et al. | 244/3.19 |
| 6,871,077 | B2* | 3/2005 | Kennedy, Jr. | 455/456.5 |
| 6,985,745 | B2* | 1/2006 | Quaid | 455/456.2 |
| 7,020,475 | B2* | 3/2006 | Bahl et al. | 455/456.1 |
| 7,035,651 | B2* | 4/2006 | Schreiner et al. | 455/456.5 |
| 7,038,584 | B2* | 5/2006 | Carter | 340/539.13 |
| 7,116,988 | B2* | 10/2006 | Dietrich et al. | 455/456.1 |
| 2001/0022558 | A1* | 9/2001 | Karr et al. | 342/450 |
| 2002/0055360 | A1* | 5/2002 | Chen et al. | 455/452 |
| 2003/0008668 | A1* | 1/2003 | Perez-Breva et al. | 455/456 |
| 2003/0050089 | A1 | 3/2003 | Ogino et al. | |
| 2003/0129992 | A1* | 7/2003 | Koorapaty et al. | 455/456 |
| 2004/0072577 | A1* | 4/2004 | Myllymaki et al. | 455/456.1 |
| 2005/0032531 | A1* | 2/2005 | Gong et al. | 455/456.5 |
| 2005/0040968 | A1* | 2/2005 | Damarla et al. | 340/825.49 |
| 2005/0136845 | A1* | 6/2005 | Masuoka et al. | 455/67.14 |
| 2005/0261004 | A1* | 11/2005 | Dietrich et al. | 455/456.2 |

FOREIGN PATENT DOCUMENTS

| | | |
|---|---|---|
| WO | WO 03069367 | 8/2003 |

OTHER PUBLICATIONS

International Search Report issued for PCT/CN2005/000275, dated Aug. 18, 2005.

* cited by examiner

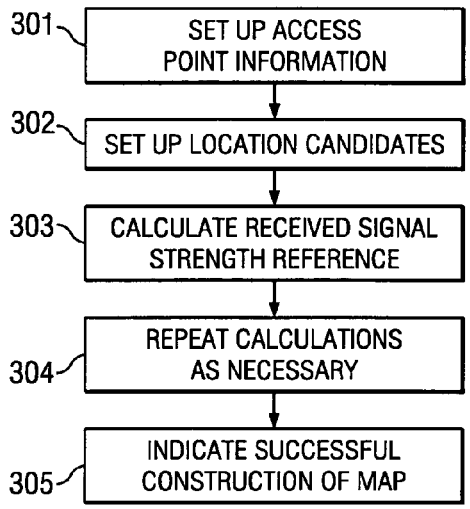

*FIG. 3*

301 SET UP ACCESS POINT INFORMATION

302 SET UP LOCATION CANDIDATES

303 CALCULATE RECEIVED SIGNAL STRENGTH REFERENCE

304 REPEAT CALCULATIONS AS NECESSARY

305 INDICATE SUCCESSFUL CONSTRUCTION OF MAP

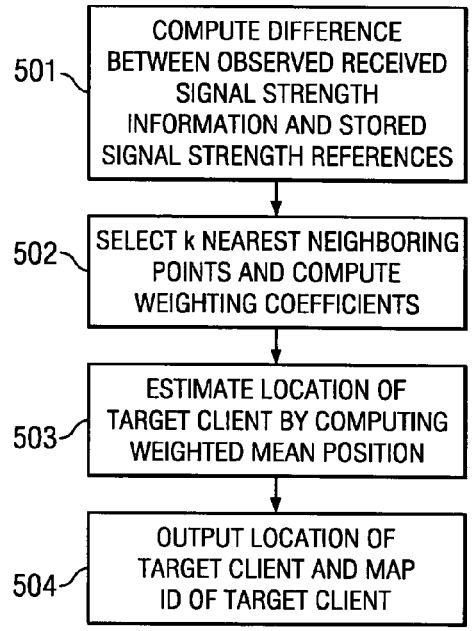

*FIG. 5*

501 COMPUTE DIFFERENCE BETWEEN OBSERVED RECEIVED SIGNAL STRENGTH INFORMATION AND STORED SIGNAL STRENGTH REFERENCES

502 SELECT k NEAREST NEIGHBORING POINTS AND COMPUTE WEIGHTING COEFFICIENTS

503 ESTIMATE LOCATION OF TARGET CLIENT BY COMPUTING WEIGHTED MEAN POSITION

504 OUTPUT LOCATION OF TARGET CLIENT AND MAP ID OF TARGET CLIENT

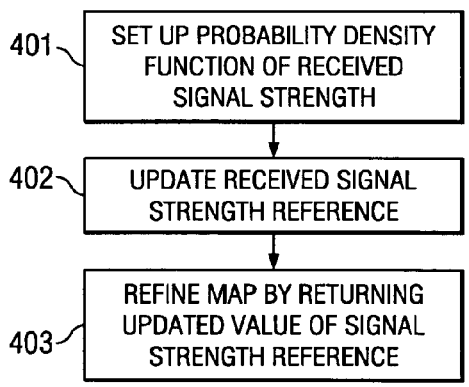

*FIG. 4*

401 SET UP PROBABILITY DENSITY FUNCTION OF RECEIVED SIGNAL STRENGTH

402 UPDATE RECEIVED SIGNAL STRENGTH REFERENCE

403 REFINE MAP BY RETURNING UPDATED VALUE OF SIGNAL STRENGTH REFERENCE

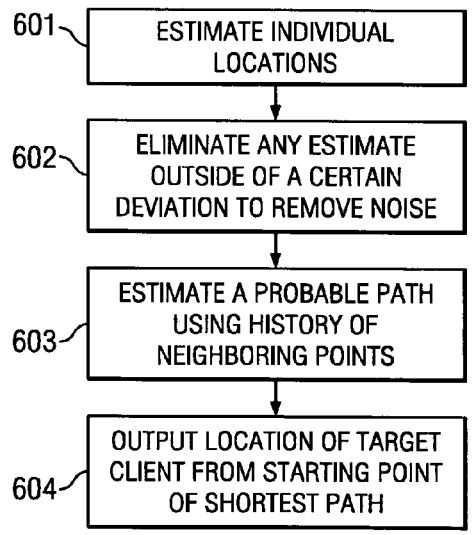

*FIG. 6*

601 ESTIMATE INDIVIDUAL LOCATIONS

602 ELIMINATE ANY ESTIMATE OUTSIDE OF A CERTAIN DEVIATION TO REMOVE NOISE

603 ESTIMATE A PROBABLE PATH USING HISTORY OF NEIGHBORING POINTS

604 OUTPUT LOCATION OF TARGET CLIENT FROM STARTING POINT OF SHORTEST PATH

LOCATION DETERMINATION AND LOCATION TRACKING IN WIRELESS NETWORKS

CROSS-REFERENCE TO RELATED APPLICATIONS

The present invention is related to co-pending and commonly assigned U.S. patent application Ser. No. 10/635,367 entitled "Location Positioning in Wireless Networks," filed Aug. 6, 2003, the disclosure of which is hereby incorporated herein by reference.

TECHNICAL FIELD

The present invention is directed toward wireless communications and, more particularly, to refining location positioning determinations for wireless devices.

BACKGROUND OF THE INVENTION

It is sometimes desirable to locate the position of a station operable within a wireless, e.g., radio frequency (RF), network. For example, the United States Federal Communications Commission (FCC) has decreed that cellular telephone systems must implement systems to provide mobile telephone position information for use in emergency response, e.g., enhanced 911 (E911) emergency response. Additionally, the position of a station may be important for providing particular services, such as, for example, identifying subscribers and non-subscribers, resource allocation, network security, and location-sensitive content delivery, among other services.

In order to estimate a station's location, a system typically measures a metric that is a function of distance. A typical measured metric is signal strength, which decays logarithmically with distance in free space. Time information, such as time of arrival of a signal or time difference of arrival of a signal at diverse antennas, may be utilized as a measured metric from which distance information may be determined. Typically, several reference points are used with distance information derived from the measured metric in estimating location.

The use of global positioning system (GPS) receivers, which operate in conjunction with a network of middle earth orbit satellites orbiting the Earth to determine the receiver's position, has almost become ubiquitous in navigational applications. In such a GPS network, the aforementioned reference points are the satellites and the measured metric is the time of arrival of the satellite signal to the GPS receiver. The time of arrival of the satellite signal is typically directly proportional to the distance between the satellite and the GPS receiver due to a clear line of sight between the GPS receiver and satellite. By measuring the time of arrival associated with three satellites, a GPS receiver can calculate the longitude and latitude of the GPS receiver. By using time of arrival information with respect to a fourth satellite, a GPS receiver can also determine altitude.

In the aforementioned cellular networks, techniques including signal strength measurements and/or time difference of arrival have been implemented for location determination. For example, U.S. Pat. No. 6,195,556, the disclosure of which is incorporated herein by reference, teaches the use of signal strength measurements in combination with the time difference of arrival of a station's signal in determining the location of the station. Additionally, U.S. Pat. No. 6,195,556 teaches the use of mapping of received signal characteristics associated with particular positions (e.g., receive "signature" associated with each of a plurality of remote station locations) for use in determining a station's location. In the case of the aforementioned cellular network, the base transceiver stations (BTSs) are generally relied upon as the reference points from which distance determinations are made.

Wireless local area network (WLAN) location determination systems have been implemented in two phases: the offline phase and the online phase. In the offline phase, prediction or measurement of the fingerprint (e.g., signal strength, multipath characteristics, etcetera) of wireless access points at particular locations within the service area may be carried out. Location fingerprints may be predicted or measured off-line, such as when a network is being deployed, and are stored in a database resulting in a so-called radio map to relate the wireless signal information and coordinates of the known locations. In the online phase, the fingerprint associated with a remote station at an unknown location is measured during later operation of the network, and compared to the entries in the database. A location estimation algorithm is then applied to infer the location estimate for the unknown location. Location estimation algorithms include, for example but not limited to, triangulation, nearest neighborhood, K-nearest neighbor averaging, and history-based shortest path.

Previously, developing an accurate radio map for location determination required manual calibration throughout the network environment, meaning that before a location determination could be made, an engineer would actually have to physically go out and make calibration measurements at some specified points over the area covered by the network. Based on the manual measurements, the system would construct the radio map, and then make a location determination. This is known as supervised calibration or supervised training. Making manual calibration measurements is expensive and consumes significant manpower. Furthermore, because the wireless environment is constantly changing, the measured parameters are also changing, and repeating calibration to update the measurements is impractical and inefficient. Supervised training, requiring manual calibration, provides relatively accurate resolution, but over time, the accuracy fails as the networks parameters change. It is, therefore, desirable to eliminate the need for making costly and time consuming manual measurements.

BRIEF SUMMARY OF THE INVENTION

The present invention is directed to systems and methods which monitor a network environment, collect client information available online, and refine location determinations of individual clients based on observed information as well as online information. More particularly, embodiments of the present invention comprise to systems and methods which monitor the wireless network, such as by collecting online receive signal strength indicator (RSSI) information observations from client users, to provide location determinations without requiring knowledge of those clients' precise locations.

Embodiments of the present invention are additionally directed to systems and methods to enhance the accuracy of the location determinations in a network, based on observed client information such as, for example, signal strength references. In one embodiment of the present invention, the method employs online received signal strength observations from multiple clients, with known or unknown locations, together with the original observed or estimated signal strength database to refine a radio map of the network environment. Online RSSI observations from client users may be compared with the original observed or estimated signal strength database and the radio map may be refined based on unsupervised training capabilities. Unsupervised system training according to embodiments of the present invention reduces or eliminates the need for live calibration of the network, and instead, existing measurements online can be used to calibrate and fine tune the radio map of the network environment. Additionally, according to embodiments of the present invention, collected RSSI information may be obtained from the normal network transmissions and therefore, does not require any extra overhead to obtain and use the information in location determination.

It is an object of embodiments of the present invention to create an original radio map of mobile station location without requiring manual calibration, by comparing online observations with a generic model estimation and following iterations through until the radio map is within a certain degree of accuracy.

It is a further object of embodiments of the present invention to update an existing radio map of mobile station location created by supervised training, without manually re-measuring network parameters to update calibrations.

It is a yet another object of embodiments of the present invention to use unsupervised training to update an existing radio map of mobile station location that was created by supervised training without expending additional money and manpower.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which

FIG. 3 shows a flow diagram setting forth steps of a preferred embodiment algorithm for construction of a radio map;

FIG. 4 shows a flow diagram setting forth steps of a preferred embodiment algorithm for iteratively refining a radio map for location determination;

FIG. 5 shows a flow diagram setting forth steps of a preferred embodiment algorithm for online location determination; and FIG. 6 shows a flow diagram setting forth steps of a preferred embodiment algorithm for online location tracking.

DETAILED DESCRIPTION OF THE INVENTION

Figure 1A:
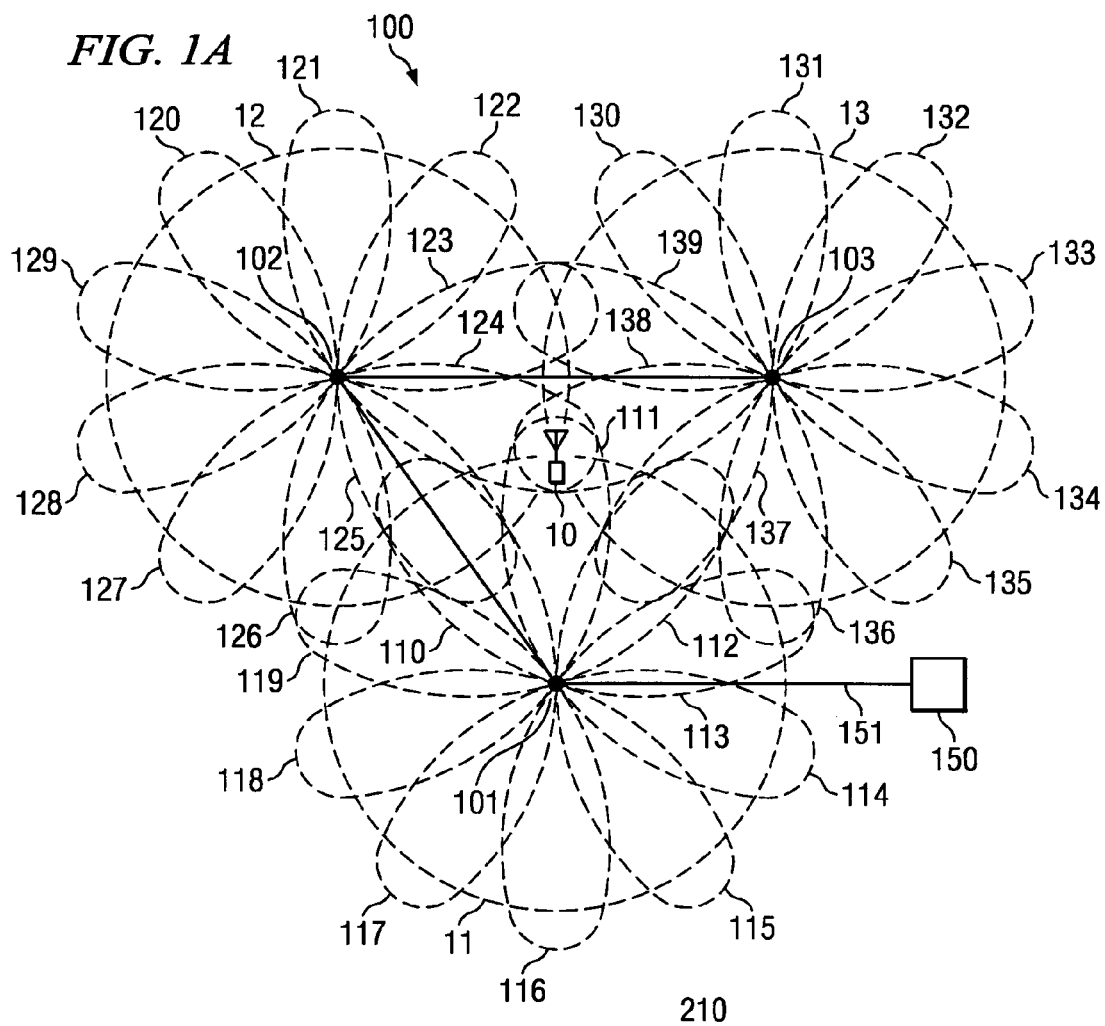
FIG. 1A shows a wireless network system into which embodiments of the present invention may be deployed.

One embodiment of the present invention involves constantly monitoring a network environment, such as, for example, a wireless network, by collecting the information for client users, such as RSSI information, and making the information available online. Using this information made available online, the unsupervised learning theory may be used to refine a radio map of the network environment and result in more accurate location determinations.

The theory of unsupervised learning in pattern classification is generally summarized here. For example, $D=\{x_1, x_2, \ldots, x_n\}$ denotes the set of n unlabeled feature observations drawn independently from a known number c of clusters $w=\{w_1, w_2, \ldots, w_c\}$, according to the mixture density according to the mixture density $$p(x \mid \theta) = \sum_{j=1}^{c} p(x \mid w_j, \theta_j) P(w_j), \quad (1)$$

where the forms for the cluster-conditional probability of the feature $p(x|w_j, \theta_j)$ may be known (e.g. multi-variant Gaussian distribution), but the values for the c parameters $\theta=\{\theta_1, \theta_1, \ldots, \theta_c\}$ may be unknown. The prior probabilities $P(w_j)$ may also be included among the unknown parameters. The objective is to estimate the parameters $\theta$ and $P(w_j)$ with j=1, 2, ... c using the unlabeled observation set D. The maximum-likelihood estimations of $\theta$ and $P(w)$ are the values that maximizes the joint density $p(D|\theta)$, represented by the equation:

$$(\hat{\theta}, \hat{P}(w)) = \underset{\theta, P(w)}{\mathrm{argmax}} \ p(D \mid \theta) = \underset{\theta, P(w)}{\mathrm{argmax}} \prod_{k=1}^{n} p(x_k \mid \theta), \quad (2)$$

subject to the constraints that $P(w_j) \geq 0$, and $$\sum_{j=1}^{c} P(w_j) = 1.$$

In a multi-variant Gaussian distribution case, each parameter $\theta_j$ consists of the components of mean vector $\mu_j$ and covariance matrix $\Sigma_j$, and $p(x|w_j, \theta_j)$ is given by $$p(x \mid w_j, \theta_j) = \frac{1}{(2\pi)^{d/2} |\Sigma_j|^{1/2}} \exp\left[-\frac{1}{2}(x-\mu_j)^T \Sigma_j^{-1}(x-\mu_j)\right], \quad (3)$$

where d is the dimension of the feature vector, $|\Sigma_j|$ and $\Sigma_j^{-1}$ are the determinate and inverse, respectively, of $\Sigma_j$, and $(x-\mu)^T$ is the transpose of $x-\mu$. If the unknown quantities are $\mu_j$ and $P(w_j)$, the solution to equation (2) is governed by the following equations:

$$\hat{\mu}_j = \frac{\sum_{k=1}^{n} \hat{P}(w_j \mid x_k, \hat{\mu}) x_k}{\sum_{k=1}^{n} \hat{P}(w_j \mid x_k, \hat{\mu})}, \quad j = 1, \ldots, c \quad (4)$$

$$\hat{P}(w_j) = \frac{1}{n} \sum_{k=1}^{n} \hat{P}(w_j \mid x_k, \hat{\mu}) \quad (5)$$

where $$\hat{P}(w_j \mid x_k, \hat{\mu}) = \frac{p(x_k \mid w_j, \hat{\mu}_j) \hat{P}(w_j)}{\sum_{i=1}^{c} p(x_k \mid w_i, \hat{\mu}_i) \hat{P}(w_i)}. \quad (6)$$

While these equations appear to be rather formidable, the interpretation is actually quite simple and shows that the maximum-likelihood estimate for $\mu_j$ is merely a weighted average of the samples; the weight for the k-th sample is an estimate of how likely it is that $x_k$ belongs to the j-th cluster. In the extreme case where $\hat{P}(w_j|x_k, \hat{\mu})$ is 1.0 when $x_k$ is from cluster $w_j$ and 0.0 otherwise, $\hat{P}(w_j)$ is the fraction of samples from $w_j$, and $\hat{\mu}_j$ is the mean of those samples.

If fairly accurate initial estimations $\hat{\mu}_j(0)$ and $\hat{P}_0(w_j)$ are available, equations (4-6) indicate an iterative scheme for improving the estimations, according to the equations:

$$\hat{P}_i(w_j \mid x_k, \hat{\mu}) = \frac{p(x_k \mid w_j, \hat{\mu}_j) \hat{P}_i(w_j)}{\sum_{i=1}^{c} p(x_k \mid w_i, \hat{\mu}_i) \hat{P}_i(w_i)} \quad (7)$$

$$\hat{\mu}_j(i+1) = \frac{\sum_{k=1}^{n} \hat{P}_i(w_j \mid x_k, \hat{\mu}(i)) x_k}{\sum_{k=1}^{n} \hat{P}_i(w_j \mid x_k, \hat{\mu}(i))}. \quad (8)$$

$$\hat{P}_{i+1}(w_j) = \frac{1}{n} \sum_{k=1}^{n} \hat{P}_i(w_j \mid x_k, \hat{\mu}(i)) \quad (9)$$

This is, generally, a gradual procedure for maximizing the likelihood function. If the overlap between cluster-conditional densities is small, then the coupling between clusters will be small and converge will be fast. Application of this theory of unsupervised learning allows one to correct, refine or update the accuracy of a radio map through iteration, rather than re-measurement of the network environment and manual re-calibration.

Embodiments of the present invention employ unsupervised learning theory applied directly in location determination technology to create the received signal strength references. Accordingly, location determination is regarded as a pattern classification problem. In specific, the clusters are the particular points in the service area of a network, and the feature space is the RSSI information of a wireless station as experienced by wireless access nodes in the network. Assuming that the received signal strength in a wireless environment follows a log-normal shadowing model, RSSI samples in dB scale from each location candidate are modeled as a multi-variant Gaussian distribution. Further assuming that the standard deviation of the shadowing effects is fixed and known, equations (7-9) can be used in a straight manner to iteratively update the signal strength references $\mu = \{\mu_1, \mu_1, \ldots, \mu_c\}$ at candidate points $w = \{w_1, w_2, \ldots, w_c\}$.

Embodiments of the invention utilize an initial estimation of the signal strength references. For example, signal strength references obtained according to the method disclosed in United Stated patent application Ser. No. 10/635,367 entitled "Location Positioning in Wireless Networks," may serve to provide an initial estimation on $\mu$ according to one embodiment of the present invention. An initial estimation on $\mu$ may alternatively be generated according to one embodiment of the present invention, as will be discussed. With sufficient RSSI observation samples, the signal strength reference at each grid point converges to a more accurate value.

Directing attention to FIG. 1A, an exemplary wireless network system is shown as network 100. It should be appreciated that network 100 may comprise a portion of a WLAN, WMAN, cellular network, satellite network, and/or the like. However, to better aid the reader in understanding the concepts of the present invention, reference herein shall be made to an embodiment wherein network 100 comprises a portion of a WLAN or WMAN and, therefore, terminology consistent with such a wireless network is used. It will readily be understood by one of skill in the art that the relevant wireless network aspects discussed herein have corresponding structure in other wireless network configurations and, therefore, implementation of the present invention with respect to such other wireless network configurations will readily be understood from the disclosure herein. For example, wireless access nodes are present in each of the foregoing wireless networks, although perhaps referenced using a different lexicon (e.g., access point (WLAN and WMAN), base transceiver station (cellular network), and transceiver (satellite network)).

In the embodiment illustrated in FIG. 1A, network backbone 151, such as may comprise wireline links, optic links, and/or wireless links, couples nodes of network 100. Specifically, processor-based system 150, such as may comprise a network server, a network workstation, a location positioning system, or even another network, e.g., the Internet, is shown coupled to access points ("APs") 101-103 via network backbone 151. According to a preferred embodiment, network backbone 151 provides data communication according to a standard protocol, such as Ethernet, SONET, or the like, although proprietary protocols may be utilized if desired.

APs 101-103 of the illustrated embodiment provide RF illumination of a service area using multiple antenna patterns. For example, APs 101-103 may implement smart antenna configurations employing phased arrays and/or antenna beam switching to provide multiple antenna patterns. Commercially available APs adapted to provide multiple antenna patterns include, for example, the 2.4 GHz Wi-Fi switches available from Vivato, Inc., San Francisco, Calif.

The illustrated embodiment shows a configuration in which each AP has 10 approximately 36° directional antenna patterns and one omni-directional (approximately 360°) antenna pattern associated therewith. Specifically, AP 101 has directional antenna patterns 110-119 and omni-directional antenna pattern 11 associated therewith. Similarly, AP 102 has directional antenna patterns 120-129 and omnidirectional antenna pattern 12 associated therewith and AP 103 has directional antenna patterns 130-139 and omnidirectional antenna pattern 13 associated therewith.

It should be appreciated that the directional antenna patterns of the illustrated embodiment are disposed to provide wave fronts along different azimuthal angles, thereby providing directional coverage throughout a portion of the service area around each corresponding AP. However, it should also be appreciated that operation of the present invention is not limited to the particular antenna pattern configuration represented in FIG. 1A. For example, an AP may be configured to provide coverage in less than a 360° radius about the AP.

Figure 2A:
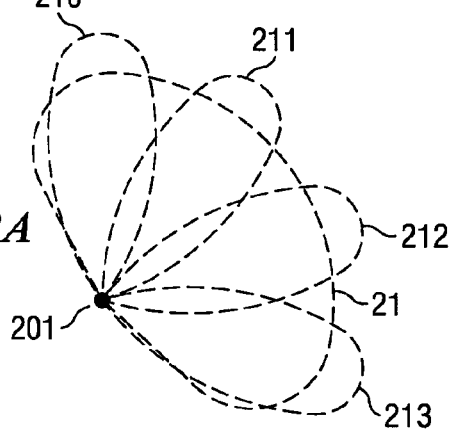
FIGS. 2A and 2B show various multiple antenna pattern configurations as may be utilized according to embodiments of the present invention.

As shown in FIG. 2A, an AP might be configured to provide a relatively wide antenna pattern covering a desired area, or portion thereof, and multiple more narrow antenna patterns within that area. In the example of FIG. 2A, AP 201 is configured to provide wide antenna pattern 21, such as may comprise an approximately 120° beam, and narrow antenna patterns 210-213, such as may comprise approximately 30° beams. AP 201 is not limited to providing illumination of the area shown and may, for example, implement 2 additional such multiple antenna pattern configurations centered at different azimuthal angles, to thereby provide 360° illumination.

Figure 2B:
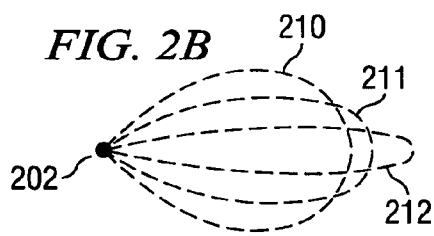

As shown in FIG. 2B, an AP might be configured to provide multiple overlapping directional antenna patterns centered at a same azimuthal angle. Specifically, relatively wide antenna pattern 210, such as may comprise an approximately 60° beam, more narrow antenna pattern 211, such as may comprise an approximately 36° beam, and narrow antenna pattern 212, such as may comprise an approximately 5°, are each centered at a same azimuthal angle with respect to AP 202. As with AP 201 discussed above, AP 202 may implement additional such multiple antenna pattern configurations centered at different azimuthal angles, to thereby provide desired illumination.

Irrespective of the particular antenna patterns implemented, the APs provide information communication links with respect to remote stations disposed within the service area of the wireless network. Referring again to FIG. 1A, remote station 10 is shown disposed in antenna patterns 11 and 111 of AP 101, antenna patterns 12 and 124 of AP 102, and antenna patterns 13 and 138 of AP 103. Any of APs 101-103 may be invoked to provide a wireless link with remote station 10, thereby facilitating network communication via network backbone 151 with respect to remote station 10.

Figure 1B:
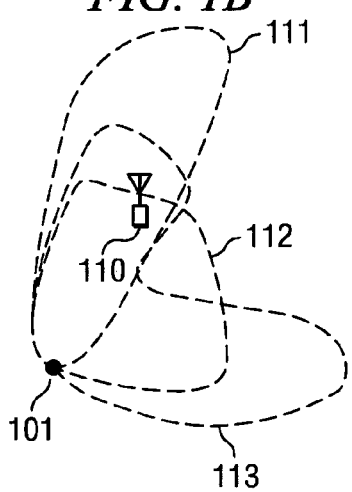
FIG. 1B shows antenna patterns of FIG. 1A having gain components in a wide azimuthal range as may be present in an actual deployment.

It should be appreciated that the antenna patterns illustrated in FIG. 1A are highly simplified in order to more clearly convey the concepts of the present invention. For example, rather than providing the highly directional, clearly defined beams of FIG. 1A, APs may provide patterns which have gain components throughout a relatively wide azimuthal range. Directing attention to FIG. 1B, radiation patterns 111-113 of AP 101 having a relatively wide azimuthal range of antenna gain components are shown, as might be experienced in an actual deployment. Accordingly, one of skill in the art will readily appreciate that a remote station may be disposed in areas outside of where the radiation patterns of various APs are illustrated to be overlapping and yet still be in wireless communication therewith. Such gain components associated with a number of antenna patterns in a direction of a particular remote station enhances the ability to accurately determine and refine accuracy of positions according to embodiments of the present invention.

As previously mentioned, an initial estimation on signal strength references may be obtained according to the method disclosed in United Stated patent application Ser. No. 10/635,367 entitled "Location Positioning in Wireless Networks." Additionally or alternatively, a database providing an initial estimation on signal strength references may be constructed as follows. For example, an indoor wireless channel propagation model may be used to obtain received signal strength references for construction of a radio map according to the following generic log path loss model:

$$P(d) = P(d_0) - 10\beta \, lg \frac{d}{d_0} \quad (10)$$

where $P(d_0)$ represents the power (in dB scale) received at a reference distance $d_0$ from a radiating transmit antenna and $\beta$ is the path loss exponent. The values of the parameters $P(d_0)$ and $\beta$ depend on the practical environment and radiation power.

Directing attention to FIG. 3, a flow diagram setting forth steps of a preferred embodiment algorithm for construction of a radio map is shown. Step 301 of the embodiment illustrated in FIG. 3 sets up AP information. The variable K denotes the total number of APs in the environment to be mapped. Each AP, denoted as APk with $1 \leq k \leq K$, is equipped with a "smart antenna" panel that contains multiple radiation patterns. Each radiation pattern may have different gain profile. These gains are known or may be obtained from the antenna and/or beam forming characteristics of the system. For example, a particular antenna pattern may have a gain table associated therewith which may be provided by the manufacturer or relatively easily determined using well-known formulae in the RF engineering field. The variable $P_k$ denotes the number of radiation patterns associated with the k-th AP. Then, the gain of the p-th ($1 \leq p \leq P_k$) pattern at angle $\theta$ ($0° \leq \theta < 360°$) can be denoted by the variable $Gain_k[p, \theta]$. Different APs may be equipped with the same or different antenna panels. AP information also includes the physical location of each AP in the area of interest which may be represented by the x-y coordinate, and the smart antenna panel direction.

Step 302 of the embodiment illustrated in FIG. 3 sets up a set of location candidates in the environment of interest. For example, an imaginary grid may be established to demarcate a number of positions within the environment, or a portion thereof, which provide a desired level of resolution with respect to location estimation. Each position demarcated by the grid may be regarded as a location candidate. The set $\{w_j, j=1, 2, \ldots, c\}$ denotes a collection of candidate points in the environment of interest. The physical location of each element $w_j$ may be represented by x-y coordinate.

Step 303 of the embodiment illustrated in FIG. 3 calculates the received signal strength reference. Assuming that there is an imaginary remote station transmitting from each location candidate $w_j$, the received signal strength reference experienced by each antenna pattern of the multiple antenna patterns of an AP may be predicted according to the channel propagation model previously discussed. Specifically, the variable $\mu_j[k, p]$ denotes the signal strength reference at the p-th antenna pattern of the k-th AP from the j-th location candidate. The variable $\mu_j[k, p]$ can be calculated according to the following equation:

$$\mu_j[k, p] = P(d_0) - \beta \lg \frac{d(w_i, AP_k)}{d_0} + Gain_k[p, \theta(w_i, AP_k)], \quad (11)$$

where $d(w_i, AP_k)$ denotes the geometrical distance between the j-th point, $w_i$, and the k-th AP, $AP_k$, and $\theta$ ($w_i$, $AP_k$) is the angle between $w_i$ and $AP_k$ with respect to the antenna panel direction of $AP_k$.

Typically, in an embodiment of the present invention, $P(d_0)$ can be calculated, given the transmission power, using the Friis free space equation. In some environments, however, $P(d_0)$ may also be obtained empirically. For example, $P(d_0=1.7 \text{ m})=-36$ dBm in a semi-open environment using a Lucent Orinoco WLAN Card. The path loss exponent $\beta=3$ in an office environment with typical cubicles.

Equation (11) may be repeated until $\mu_j[k,p]$ has been computed for all k, p and j, thereby constructing a radio map using a generic propagation model together with multiple antenna radiation patterns.

Steps of the embodiment illustrated in FIG. 3 are preferably performed when a network is initially deployed and/or when its configuration is changed. For example, the AP information may be modified when APs are added or removed from the network, when the location of an AP is changed, when the antenna pattern configuration of an AP is changed, and the like.

A refining process implemented according to an embodiment of the present invention may be used to increase the accuracy of the radio map constructed as discussed in reference to the embodiment of the present invention illustrated in FIG. 4. Directing attention to FIG. 4, a flow diagram setting forth steps of a preferred embodiment algorithm for iteratively refining a radio map for location determination is shown. The system contains input data including an original radio map (database of received signal strength references), a set of prior probabilities of location candidates, and a set of online RSSI observations from multiple client users with known or unknown locations. The original radio map may be generated by manual measurements to be improved by unsupervised learning or by predictions to be refined to more accurate values by unsupervised learning.

Step 401 of the embodiment illustrated in FIG. 4 sets up the location-conditional probability density function of a received signal strength. The variable x denotes a random vector of received signal strength observed from all the APs in the network with each AP containing multiple antenna patterns. The variable x[k,p] denotes the random variable of signal strength (in dB scale) from the k-th AP ($1 \leq k \leq K$) at the p-th pattern ($1 \leq p \leq P_k$). Each x[k,p] is assumed to be independent and have a Gaussian distribution with the same standard deviation a. The value of the parameter a depends on the standard deviation of the log normal shadowing in the environment of interest, and could be obtained empirically. For example, it may be assumed that $\sigma$=approximately 3~5 dBm. Thus, the conditional probability of x given location candidate $w_j$, $1 \leq j \leq c$, can be expressed according to the following equation:

$$p(x \mid w_j, \theta_j) = c \cdot \exp\left\{-\frac{1}{2\sigma^2}\sum_{k=1}^{K}\sum_{p=1}^{P_k}(x[k, p] - \mu_j[k, p])^2\right\}, \quad (12)$$

where c is a constant for normalization, and $\mu_j$ is averaged signal strength, i.e. received signal strength reference.

Step 402 of the embodiment illustrated in FIG. 4 iteratively updates the received signal strength reference. $\{\mu_1, \mu_2, \ldots, \mu_c\}$. The initial $\hat{\mu}_j(0)$ may be predicted according to equation (11), measured through offline calibration, or obtained by other means. The initial prior probability $\hat{P}_0(w_j)$ of each location candidate may be obtained assuming a uniform distribution, i.e. $\hat{P}_0(w_j)=1/c$ for all j=1, 2, . . . c, or may be extracted from a given user density profile in the environment of interest. The variable D=$\{x_1, x_2, \ldots, X_n\}$ denotes the set of RSSI observations available online, and n denotes the total number of observations. The initial weighting coefficient $P(w_j|x_k, \mu)$ for the k-th observation $x_k$ at location candidate $w_j$ is computed using equation (7). Accordingly, $\mu_j$ is re-computed using the n weighting coefficients according to equation (8) and $P(w_j)$ is updated according to equation (9). The iterative process of computing n weighting coefficients and computing $\mu_j$ and $P(w_j)$ may be repeated until there is no more change or very little change, for example, a change=0.1%, on the $\mu_j$ and $P(w_j)$ for all j.

It should be appreciated that the algorithm described in Step 402 of the embodiment illustrated in FIG. 4 may vary significantly according to embodiments of the invention. For example, if the set of RSSI observations are known to be evenly distributed from location candidates, the update on the prior probabilities $P(w_j)$ in each iteration may alternatively be eliminated. In addition, the coverage area of APs in the network may not completely overlap. Therefore, RSSI vectors from particular locations may include null coordinates, that is, there is no observation on these coordinates which correspond to some APs or some antenna patterns of one AP. In such a case, the null coordinates of these incomplete RSSI vectors may be manually set to have a value smaller than the lowest RSSI level that a wireless LAN card can detect. For example, the null coordinates may have −100 dBm associated therewith. This approach eventually converges to set the values on the corresponding coordinates of the received signal strength reference vectors at the particular location candidates to be small so as to be undetectable by a wireless LAN card. Alternatively, when the received signal strength reference $\mu_j$ at location $w_j$ is being re-computed during each iteration, the null coordinates of incomplete online RSSI observation vectors may be set to contain the same values as those in the same coordinates of the vector $\mu_j$ during the previous iteration. This approach converges to allow the values on the corresponding coordinates of the received signal strength reference vectors at the particular location candidates to be unchanged and the same as the original. The original value may be null if obtained through offline calibration, or may be a very small value if predicted based on an accurate propagation model.

Step 403 of the embodiment illustrated in FIG. 4 refines the radio map. The updated values of $\mu_j$ for j=1, . . . , c are returned as the new, updated signal strength references in the radio map. The enhanced algorithm of the present invention is most effective when the total number of RSSI observations is much larger then number of the candidate points in the environment, i.e. where n>>c.

Steps of the embodiment illustrated in FIG. 4 are preferably performed when a sufficient number of online RSSI observations have been collected after a network is deployed, its configuration is modified, or the environment is changed. The online RSSI data may be observed through normal traffic. For example, new mobile clients may join the network from time to time at a random location within the service area of the network, and existing mobile clients may move from one location to another in the service area of the network. Without introducing any overhead in the network, sufficient RSSI data from mobile clients may be automatically collected on each AP using multiple antenna patterns through the normal traffic.

The radio-map refining algorithm in FIG. 4 may be implemented by a processor-based system operable under the control of a set of instructions defining operations as described herein. For example, a computer system having a central processing unit, such as a processor from the Intel PENTIUM family of processors, memory, such as RAM, ROM, and/or disk storage, and suitable input/output capabilities may be utilized in implementing the steps shown in FIG. 4. Such a processor-based system may be comprised of one or more of APs 101-103 and/or processor-based system 150 shown in FIG. 1. The updated radio map may be stored in the memory of the processor-based system as a database.

An online location determination phase may run concurrently with the previously discussed iterative process, above, although location estimates will be more accurate after many iterations of the previously discussed process. In determining the location of a remote station within the service area of the network, one or more APs will use multiple antenna patterns to collect information with respect to the received signal strength of the target remote station. This information is preferably sent to a processor-based system and compared to the received signal strength reference stored in the database on various techniques. For example, the distance approach disclosed in U.S. patent application Ser. No. 10/635,367 entitled "Location Positioning in Wireless Networks," may be employed. In one embodiment of the present invention, k-nearest neighbor weighted averaging and history-based shortest path approaches may be selected for determining the location of a stationary user and a moving user, respectively.

Directing attention to FIG. 5, a flow diagram setting forth steps of a preferred embodiment algorithm for k-nearest neighbor weighted averaging to determine the location of a stationary user is shown. The embodiment of the algorithm illustrated in FIG. 5 may run concurrently with the iterative process previously discussed or separately. According to FIG. 5, the system contains input data including the measured RSSI information with respect to the target client on the audible APs with all possible antenna patterns or a plurality of antenna patterns. Embodiments of the present invention may operate to estimate a remote station's position using a single AP due to the use of multiple antenna patterns. Additionally, multiple APs may be utilized to confirm the location estimate and/or to increase the reliability and/or accuracy of such an estimate.

As shown in step 501 of the embodiment illustrated in FIG. 5, the difference between the observed RSSI data and the stored signal strength references from the same APs using the same antenna pattern in the radio map may be computed. In one embodiment of the present invention, the difference metric is defined as the Euclidean distance in the signal strength space with dB scale. The variable $d_j$, with $j=1, 2, \ldots, c$, denotes the distance associated with the j-th location candidate $W_j$. The smaller the distance in the signal space is, the nearer the location candidate would be to the target client in the physical space.

As shown in step 502 of the embodiment shown in FIG. 5, k nearest neighboring points are selected and the weighting coefficient of each is computed. Within the location candidate set, k indices $\{i', i=1, 2, \ldots, k\}$ whose signal strength references are nearest according to distances computed in the previous step to the given RSSI observations are selected. The value of k may be determined by the resolution of location candidates. For example, select k=15 when the spacing between two neighboring points demarcated by an imaginary grid is equal to one meter. The weighting coefficient is defined as the inverse of the distance, i.e. $1/d_{i'}$.

As shown in step 503 of the embodiment shown in FIG. 5, the location of the target client may be estimated as the weighted mean position of the k neighbors. Specifically, the location may be estimated according to the equation (13)

$$\hat{w} = \frac{\sum_{i'=1}^{k} \frac{1}{d_{i'} + d_0} w_{i'}}{\sum_{i'=1}^{k} \frac{1}{d_{i'} + d_0}} \tag{13}$$

where $d_0$ is a small real value used to avoid division by zero.

While the algorithm in FIG. 5 contains a weighted average, a technique without using distance-metric-dependent weights may also be employed.

In one embodiment of the online location tracking phase for moving clients of the present invention, only one pattern for each antenna panel is used to collect RSSI information due to real-time constraints. As many as 3 APs may be needed, however, based on the well-known triangulation method to estimate a location. By switching the antenna patterns more rapidly, more precise results may be achieved by using multiple patterns as used in the location determination phase.

When tracking a target client, embodiments of the present invention employ the current and past RSSI observations from the client to the audible APs. The user's location at any given instant in time is likely to be near the location for the previous instant. By tracking the user continuously, signal strength information is complemented with the physical contiguity constant to continually improve the accuracy of location estimation.

Directing attention to FIG. 6, a flow diagram setting forth steps of a preferred embodiment algorithm for determining the location of a mobile user is shown. According to the embodiment shown in FIG. 6, the system contains input data including the current and past RSSI samples from the target client to the audible APs at the default antenna pattern. A history of depth h of RSSI observations from the mobile target is maintained for each location estimation.

As shown in step 601 of the embodiment shown in FIG. 6, the static case location determination is employed to determine the individual positioning for each instant of time as discussed previously, except that the distance metric, in the dynamic case, is computed over the selected default antenna pattern.

As shown in the embodiment of the algorithm shown in FIG. 6, the dynamic case location determination uses the history data to provide a more accurate location tracking path. For example, by making use of previous location estimates and the station's moving speed, the current location may be predicted and any current erratic estimate based on the current signal power may be cancelled.

In the dynamic case with a moving target, it is possible to take the same approach as in the static case and estimate each position independently. Since the target is moving, however, a more accurate location estimation can be achieved, particularly given that the static-case estimate may contain noise, by taking into account the "velocity" or "speed" of the moving target.

As shown in step 602 of the embodiment shown in FIG. 6, in the dynamic case, eliminating any estimate exceeding a certain deviation removes noise. This prevents an erratic "jump" over a large distance, due to the generalization that the station's location at any given instant is likely to be near the location at the previous instant in time.

As shown in step 603 of the embodiment shown in FIG. 6, in the dynamic case, a shortest path may be estimated using a Viterbi-like algorithm.

For example, the 8 nearest neighboring points (in either signal space or physical space) of each estimated individual location for each instant in time, i.e., the 9 best guesses of the station's location for each time instance, may be chosen. Therefore, a history of depth h of such 9 neighbors, according to the earlier example, may be generated. The collected data of the exemplary 9 by h matrix can be viewed as a trellis tree. There are transitions only between columns containing consecutive sets (one set has 9 neighbors, for example). Each transition may be assigned a weight to model the likelihood of the user transitioning in successive instants in time between the locations represented by the two endpoints of the transition path. The larger the weight, the less likely the transition. The Euclidean distance between the two physical locations, calculated according to a simple metric, determines a weight. Each time the trellis tree (the matrix) is updated with the most 9 recent neighbors (and the deletion of the oldest set of neighbors), the shortest path between stages in the oldest and newest sets may be computed. According to embodiments of the present invention, the shortest path represents the most probabilistic movement of the station.

Once the shortest path is determined, the station's location may be estimated as the point at the start of the path, as shown in Step 605 of the embodiment shown in FIG. 6. Application of this methodology indicates consideration of the physical contiguity constraint, and also implies a time delay of h signal strength samples. In this example, set h=3.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
   one or more wireless network access nodes, said one or more wireless network access nodes providing a plurality of antenna patterns;
   calculation logic for determining receive signal strength differences with respect to a signal as received by said one or more wireless access nodes using said plurality of antenna patterns, said signal being transmitted from a location unknown to said system;
   a radio map providing location estimates associated with use of said plurality of antenna patterns; and
   calculation logic for improving said radio map using said receive signal strength differences determined by said calculation logic for determining receive signal strength differences, wherein said improving said radio map comprises using a series of receive signal strength differences determinations to iteratively improve said radio map.

2. The system of claim 1, wherein said calculation logic for improving said location estimates includes a location-conditional probability density function for use in improving said location estimates using said receive signal strength differences.

3. The system of claim 2, wherein said location-conditional probability density function includes a probability for each location estimate of said radio map.

4. The system of claim 2, wherein said location-conditional probability density function is determined using a user density profile.

5. The system of claim 2, wherein said location-conditional probability density function is determined using weighting coefficients.

6. The system of claim 1, wherein said calculation logic for improving said location estimates includes weighting coefficients for weighting said receive signal strength differences in a location estimate calculation.

7. The system of claim 6, wherein said weighting coefficients include a weighting coefficient for each receive signal strength observation made with respect to a particular location estimate of said radio map.

8. The system of claim 1, wherein said radio map is formed by sampling a set of multiple grid points.

9. The system of claim 1, further comprising:
   a database containing antenna gain profile information for said plurality of antenna patterns of said wireless access nodes.

10. The system of claim 9, wherein said radio map is formed by establishing a set of location candidates and calculating a receive signal strength reference for an imaginary remote station transmitting from each location candidate.

11. The system of claim 10, wherein said receive signal strength references are calculated using a geometrical distance between each of location candidates and each of said wireless network access nodes and an angle between each of said location candidates and each of said wireless network access nodes.

12. The system of claim 9, wherein said database contains antenna gain differences associated with each antenna pattern of said plurality of antenna patterns.

13. The system of claim 1, wherein said radio map is populated with receive signal strength reference information for each of said plurality of antenna patterns.

14. The system of claim 1, wherein said plurality of antenna patterns comprise multiple narrow antenna patterns and a wide antenna palt em associated with a same wireless network access node.

15. The system of claim 1, wherein said calculation logic for determining receive signal strength differences, said calculation logic for improving said location estimates, and said radio map are disposed at a centralized system in communication with said one or more wireless network access nodes.

16. The system of claim 1, wherein said calculation logic for determining receive signal strength differences, said calculation logic for improving said location estimates, and said radio map are disposed in a distributed configuration.

17. The system of claim 1, wherein said calculation logic for determining receive signal strength differences, said calculation logic for improving said location estimates, and said radio map are disposed within one or more of said wireless network access nodes.

18. A method comprising:
providing a plurality of antenna patterns in a service area;
providing a radio map of location estimates associated with use of said plurality of antenna patterns;
determining receive signal strength information with respect to a signal as received using said plurality of antenna patterns, said signal being transmitted from a location unknown to said system; and
revising said radio map using said determined receive signal strength information wherein said revising said radio map comprises using a series of receive signal strength information determinations to iteratively revise said radio map.

19. The method of claim 18, further comprising:
determining a location-conditional probability density flinction, said location-conditional probability density function being used with said determined receive signal strength in said revising said location estimates.

20. The method of claim 19, wherein said determining said location-conditional density function comprises:
determining a probability of a receive signal strength information profile for each location estimate of said radio map.

21. The method of claim 19, wherein said determining said location-conditional density function comprises:
using a user density profile.

22. The method of claim 19, wherein said determining said location-conditional density function comprises:
using weighting coefficients.

23. The method of claim 18, wherein said revising said location estimates comprises:
applying weighting coefficients to said receive signal strength information.

24. The method of claim 23, wherein said weighting coefficients include a weighting coefficient for each receive signal strength observation made with respect to a particular location estimate of said radio map.

25. The method of claim 18, wherein said providing said radio map comprises:
forming said radio map by sampling a set of multiple grid points.

26. The method of claim 18, wherein said providing said radio map comprises:
forming said radio map by establishing a set of location candidates and calculating a receive signal strength reference for an imaginary remote station transmitting from each location candidate.

27. The method of claim 26, wherein said forming said radio map comprises:
using antenna gain profile information for said plurality of antenna patterns for each location candidate.

28. The method of claim 26, wherein said receive signal strength references are calculated using a geometrical distance between each of location candidates and a wireless network access node and an angle between each of said location candidates and said wireless network access node.

29. The method of claim 26, wherein said providing said radio map comprises:

populating said radio map with receive signal strength reference information for each of said plurality of antenna patterns.

30. The method of claim 18, further comprising:
providing a database of antenna gain differences associated with each antenna pattern of said plurality of antenna patterns for use in said revising said location estimates.

31. The method of claim 18, wherein said plurality of antenna patterns comprise multiple narrow antenna patterns and a wide antenna pattern associated with a same wireless network access node.

32. The method of claim 18, further comprising:
determining a location of a remote station using said revised location estimates of said radio map.

33. The method of claim 32, wherein said determining said location comprises:
using said determined receive signal strength information.

34. The method of claim 32, wherein said determining said location comprises:
using historical information to model a likelihood of the remote station transitioning in successive instants in time.

35. A method for refinement of a map of a wireless network environment using unsupervised learning, said method comprising:
providing an initial received signal strength reference for a location on a map of a wireless network environment;
providing one or more online observations from client users of said wireless network environment;
assigning a probability density function to a receive signal strength reference for said location on said map;
calculating a weighting coefficient for said location on said map;
calculating an update received signal strength reference for said location on said map; and
replacing said initial receive signal strength reference for said location on a map with said update received signal strength reference.

36. The method of claim 35, wherein a probability of said probability density function is location-conditional.

37. The method of claim 35, wherein said calculating an update received signal strength reference for said location on said map comprises:
calculating said update received signal strength reference with said one or more online observations and said weighting coefficient.

38. The method of claim 35, further comprising:
iteratively calculating a weighting coefficient for each of the one or more locations on said grid map of a wireless network environment;
iteratively calculating an update received signal strength reference for each of the one or more locations on said grid map of a wireless network environment with said probability and said weighting coefficient; and
iteratively replacing said initial receive signal strength reference for each of the one or more locations on a grid map of a wireless network environment with each of the said update received signal strength reference.

39. A method for online location determination of a stationary target, said method comprising:
selecting a target client;
selecting one or more wireless network access nodes;
providing a radio map associated with said one or more wireless network access nodes and providing location candidates for a service area of said one or more wireless network access nodes;

computing a distance in signal space between said target client and said location candidates to identify one or more location candidates;

calculating a mean position of said one or more location candidates;

estimating a location of said target client using said mean position; and improving said estimated location, said improving comprising iteratively improving said mean potion of aid one or more location candidates.

40. The method of claim 39, wherein estimating said location of said target client comprises:

using a plurality of antenna beams associated with one or more of nearest wireless access nodes neighboring said target client.

41. The method of claim 40, wherein estimating said location of said target client comprises:

estimating location of said target client using a weighted mean position.

42. The method of claim 39, further comprising:
providing network access as a function of said location.

43. The method of claim 39, further comprising:
providing data content as a function of said location.

44. The method of claim 39, further comprising:
providing management of network resources as a function of said location.

45. A method for determining a location of a remote station in a wireless network, said method comprising:

providing a radio map providing location estimates for a plurality of points in a service area of said wireless network;

observing received signal strength information associated with a plurality of antenna patterns for a plurality of remote stations; and applying said observed receive signal strength information to improve said radio map; said improving comprising using said receive signal strength information to iteratively improve said radio map.

46. The method of claim 45, wherein said providing said radio map comprises:

calculating a radio map using a propagation model with respect to a grid of points in said service area.

47. The method of claim 45, wherein said applying said observed receive signal strength information to said radio map comprises:

applying weighting coefficients to said observed receive signal strength information.

48. The method of claim 47, wherein said weighting coefficients include a weighting coefficient for each receive signal strength observation made with respect to a particular location estimate of said radio map.

49. The method of claim 45, wherein said applying said observed receive signal strength information to said radio map comprises:

using a location-conditional probability density function.

50. The method of claim 49, further comprising:
determining said location-conditional probability density function using weighting coefficients.

51. The method of claim 50, wherein said determining said location-conditional probability density function comprises:

determining a probability of a receive signal strength information profile for each location estimate of said radio map.

52. The method of claim 50, wherein said determining said location-conditional probability density function comprises:

using a user density profite.

* * * * *

UNITED STATES PATENT AND TRADEMARK OFFICE
CERTIFICATE OF CORRECTION

PATENT NO. : 7,359,718 B2  Page 1 of 1
APPLICATION NO. : 10/836396
DATED : April 15, 2008
INVENTOR(S) : Meixia Tao et al.

It is certified that error appears in the above-identified patent and that said Letters Patent is hereby corrected as shown below:

Column 9, Line 54, delete the text "deviation a" and replace with --deviation σ--.

Column 9, Line 54, delete the text "parameter a" and replace with --parameter σ--.

In Claim 19, line number 23, delete the text "flinction" and replace with --function--.

In Claim 39, line number 9, delete the text "potion of aid" and replace with --position of said--.

In Claim 52, line number 34, delete the text "profite" and replace with --profile--.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO.       : 7,359,718 B2
APPLICATION NO.  : 10/836396
DATED            : April 15, 2008
INVENTOR(S)      : Meixia Tao et al.

It is certified that error appears in the above-identified patent and that said Letters Patent is hereby corrected as shown below:

Column 9, Line 54, delete the text "deviation a" and replace with --deviation σ--.

Column 9, Line 54, delete the text "parameter a" and replace with --parameter σ--.

Column 15, in Claim 19, line number 23, delete the text "flinction" and replace with --function--.

Column 17, in Claim 39, line number 9, delete the text "potion of aid" and replace with --position of said--.

Column 18, in Claim 52, line number 34, delete the text "profite" and replace with --profile--.

This certificate supersedes the Certificate of Correction issued July 8, 2008.

Signed and Sealed this

Twenty-ninth Day of July, 2008

JON W. DUDAS
*Director of the United States Patent and Trademark Office*